Feb. 14, 1928.
J. E. BODA
1,659,235
LEVER AND QUADRANT MECHANISM
Filed Jan. 10, 1927 2 Sheets-Sheet 1
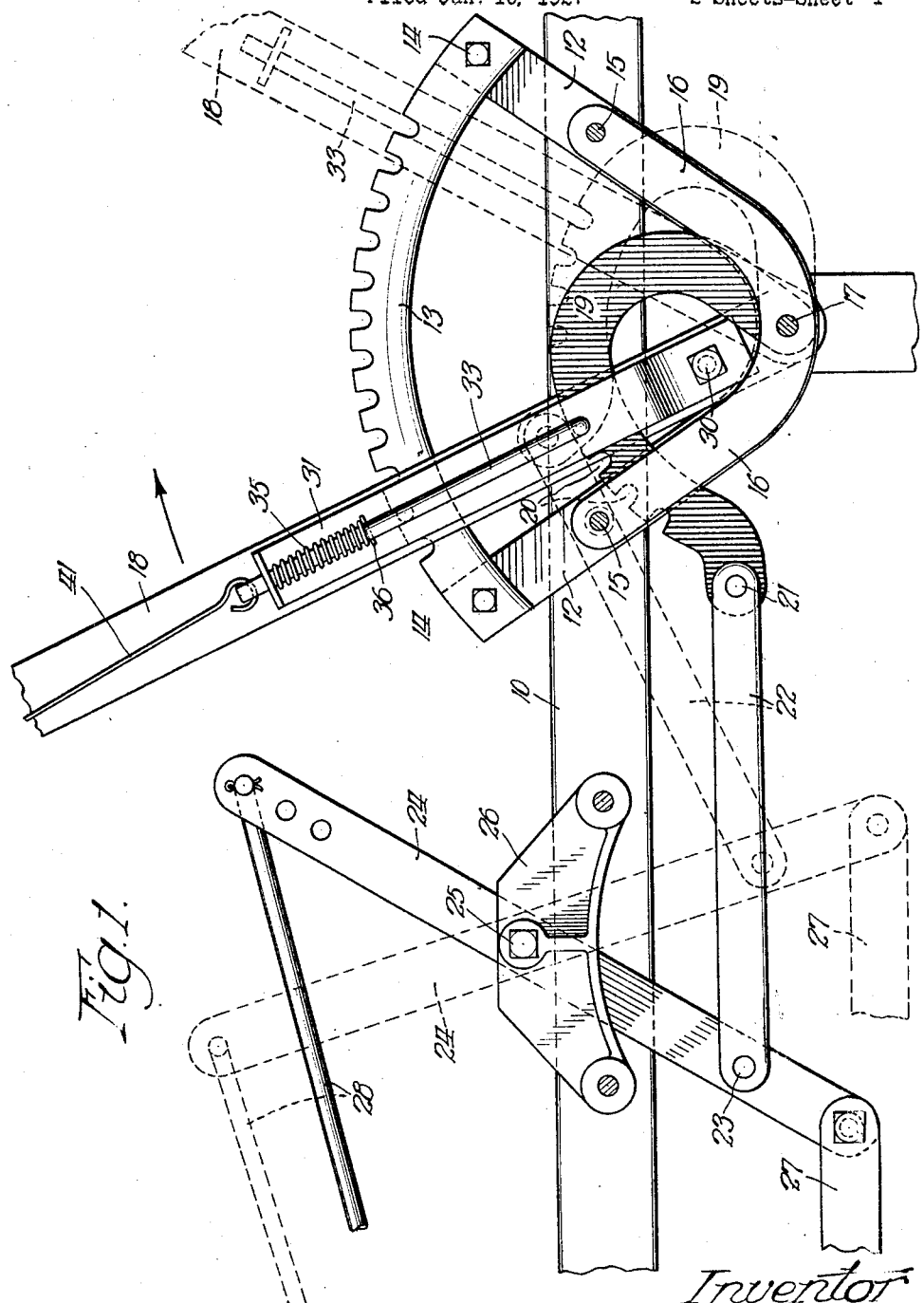
Inventor
Joseph E. Boda
By Fisher, Towle, Clapp & Soans Attys.

Feb. 14, 1928.
J. E. BODA
1,659,235
LEVER AND QUADRANT MECHANISM
Filed Jan. 10, 1927     2 Sheets-Sheet 2
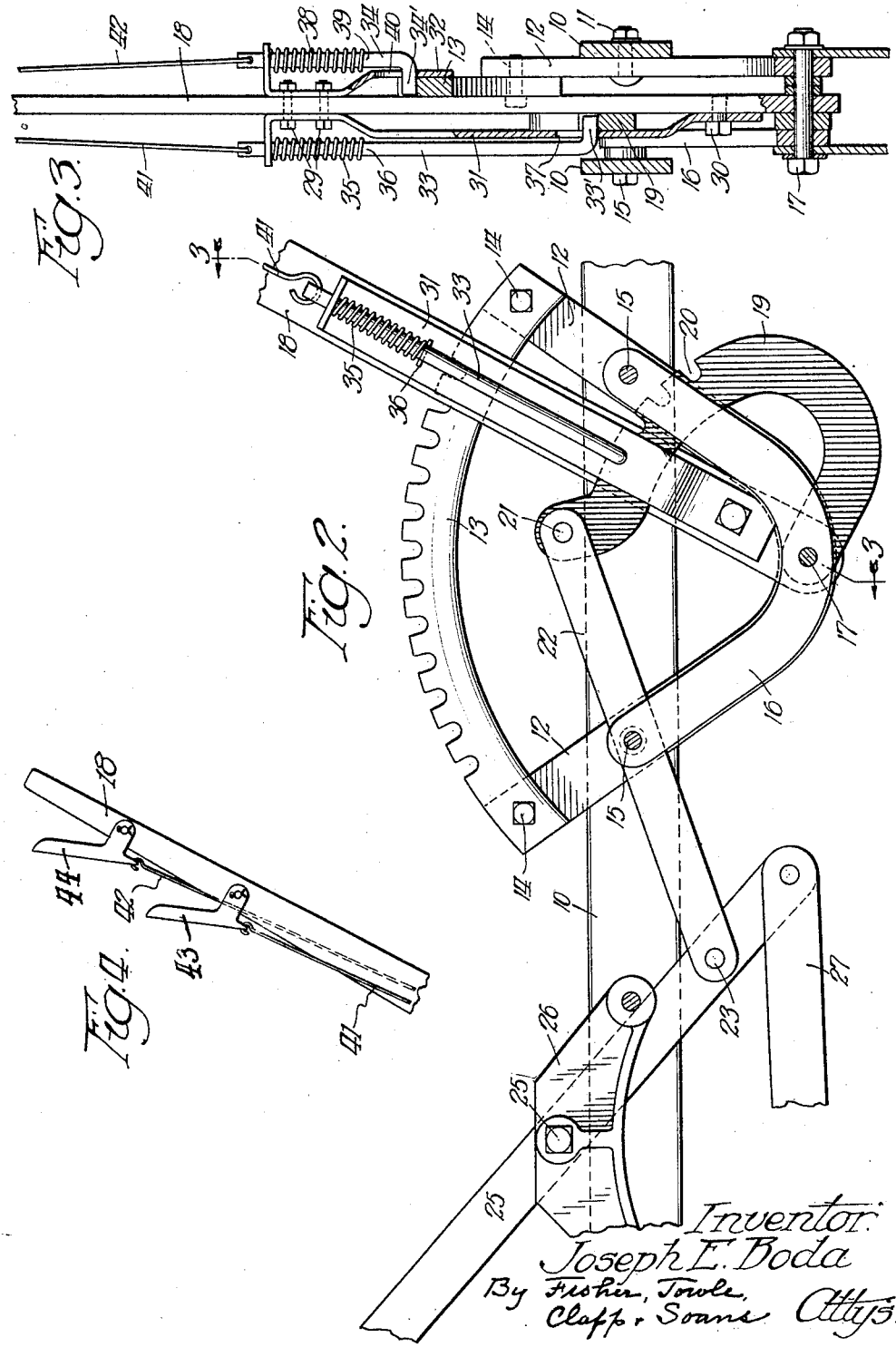
Inventor:
Joseph E. Boda
By Fisher, Towle,
Clapp & Soans  Attys.

Patented Feb. 14, 1928.

1,659,235

UNITED STATES PATENT OFFICE.

JOSEPH E. BODA, OF DIXON, ILLINOIS, ASSIGNOR TO J. I. CASE THRESHING MACHINE COMPANY, OF RACINE, WISCONSIN, A CORPORATION OF WISCONSIN.

LEVER AND QUADRANT MECHANISM.

Application filed January 10, 1927. Serial No. 160,031.

This invention relates to lever and quadrant mechanisms, and one object of the invention is to provide a mechanism through which the power of the operator on the main lever may be more efficiently applied to the part that is shifted by the swing of the lever. Another object is to provide a lever and quadrant mechanism by which the extent of movement of the shifted part may be increased over constructions wherein the draft bar or pull link is connected directly to the lever.

My invention has been designed chiefly for use on agricultural implements, more especially those known as disc harrows. It is customary to build disc harrows with a pair of disc shaft sections independently mounted on the frame and so arranged that the sections may be adjusted relatively and at various angles to the line of draft for the purpose of thoroughly pulverizing the ground. Some disc harrows are built with two front disc sections and two rear disc sections, all so mounted that they may be shifted to positions at right angles to the line of draft or oblique to the line of draft. In such implements the shifting of the disc sections is commonly effected by a single hand lever and quadrant mechanism, the lever being connected through suitable lever and link draft members to the several disc sections, so that, when the lever is thrust forwardly the disc sections are swung from oblique to right angle positions, and when the lever is pulled rearwardly, the disc sections are reversely actuated. This requires the application of considerable power to the lever, especially if the disc sections be not fully raised clear of the ground; and, as above stated, a leading object of the invention is to provide a mechanism by which the power on the lever may be more efficiently applied, and whereby also an increased length of movement may be obtained.

Still other objects and attendant advantages of the invention will be apparent to persons skilled in the art as the same becomes better understood by reference to the following detailed description, taken in connection with the accompanying drawings wherein I have illustrated one practical and approved embodiment of the invention, and in which—

Fig. 1 is a side elevation, with one limb of the quadrant frame removed, showing the main lever and the draft appliance in substantially their rearmost position, and also showing in dotted lines an intermediate position of the parts during a complete forward pull on the draft members;

Fig. 2 is a similar view showing the position of the parts at the completion of the forward pull on the draft members;

Fig. 3 is a section on the line 3—3 of Fig. 2;

Fig. 4 is a detailed view of the upper portion of the main lever showing the double grip levers thereon.

I have herein illustrated the device as applied to the forward end of a multiple section disc harrow such as is shown, for example, in Letters Patent to Henry S. Smith No. 1,489,020, April 1, 1924, but it is to be understood that the invention is capable of general application as an improved lever and quadrant mechanism, regardless of the particular machine or implement on which it is used.

Referring to the drawings, 10 designates the draft bar of a disc harrow, to the forward end of which the team or tractor is attached. This draft beam, as shown in Fig. 3, comprises a pair of spaced parallel bars, between which the lever and quadrant mechanism is mounted. Rigidly secured to the right hand draft bar, viewing Fig. 3, as by bolts 11 is a V-shaped quadrant frame-piece 12, the upper ends of which are spanned by an arcuate segment rack 13 attached to the frame-piece 12 by cap screws 14. Similarly attached to the left hand draft bar 10, viewing Fig. 3, as by bolts 15 is a somewhat shorter V-shaped frame bar 16. Extending between the lower ends of the quadrant frame-pieces 12 and 16 is a pivot bolt 17. Pivoted at its lower end on the bolt 17 is the main operating lever 18 lying substantially centrally between the two members of the draft bar 10. Also pivoted at one end on the bolt 17 adjacent to the main lever 18 is a swinging quadrant member 19 having substantially the gooseneck form shown in Figs. 1 and 2, said swinging quadrant member being formed with a plurality of notches 20 in its upper edge. To the other end of the member 19 is pivoted at 21 a link 22 which is pivoted at its rear end at 23 to a vertically disposed lever 24 fulcrumed midway of its length on a pivot pin 25 mounted in a pair of brackets 26 attached to the main draft bar 10. In the instance shown a draft link 27 connected to the lower end of lever 24 is operatively connected to the front pair of disc sections, and a draft link 28 pivoted to the upper end of the lever 24 constitutes an element of the shifting mechanism for the rear disc sections.

To the sides of the lever 18 are attached as by bolts 29 and a cap screw 30 a pair of metal straps 31 and 32 that constitute guides and lateral supports for a pair of locking dogs 33 and 34, respectively. The strap 31 throughout its intermediate portion is spaced from the lever 18, and the pivoted rack bar 19 plays between said parts. The upper end of the guide strap 31 is laterally offset and apertured to receive the stem of the dog 33 and form an abutment for the upper end of a coil thrust spring 35 encircling said stem and, through engagement with a cross-pin 36, urging the dog downwardly. At a suitable point the strap 31 is slotted, as shown at 37 to permit the passage therethrough of the locking tooth 33' of the dog, which engages with the notches 20 of the movable rack bar 19. The other strap 32 is similarly offset to overlie the outer side of the quadrant rack bar 13, and its upper end is laterally offset and apertured to form a guide for the stem of the other locking dog 34 which is normally pressed downwardly by a thrust compression spring 38 acting on a cross-pin 39. The guide strap 33 is similarly slotted as shown at 40 to accommodate the tooth 34' of the dog 34 which co-operates with the notches of the quadrant rack bar 13. Links 41 and 42 connected to the upper ends of the locking dogs 33 and 34 respectively extend upwardly alongside the lever and at their upper ends are connected to vertically spaced and independently operable grip levers 43 and 44 (Fig. 4) pivoted on the lever 18.

The manner in which the device may be operated is evident from the foregoing description of its structure but may be briefly outlined as follows.

Assuming that the parts are in the position shown in Fig. 1, and it is desired to shift the disc sections from oblique to rectangular position relatively to the line of travel, the operator, raising the dog 34, throws the lever from the position shown in full lines in Fig. 1 to the dotted line position shown in the same figure. This, through the engagement of the dog 33 with the shiftable rack bar 19 advances the latter to the position shown in dotted lines in said figure. The operator then retracts both locking dogs and swings the lever rearwardly until the dog 33 is in line with the rearmost notch of the rack bar 19, whereupon he lowers the dog 33 into said notch and again swings the lever forwardly, carrying the parts to the position shown in Fig. 2, in which position the rack bar 19 is locked through the engagement of both dogs with their respective rack bars. Similar manipulation of the lever and locking dogs in the reverse direction from the position shown in Fig. 2 returns the parts to the position shown by full lines in Fig. 1. Instead of effecting the entire movement by two shifts of the operating lever, it may manifestly be effected by several successive shifts, engaging the locking dog 33 successively with the notches of the rack bar 19, instead of only with the end notches. Such manipulation is somewhat easier due to the fact that the lever is in all positions more nearly at the vertical, or at a right angle to the line of thrust exerted by the operator. The device not only renders the work easier for the operator by enabling him to shift the parts by a step by step movement rather than by a single continuous movement, but it also increases the extent of throw possible with a given size of stationary quadrant.

I have herein shown and described one simple and practical embodiment of the invention especially adapted for use on such implements as multiple section disc harrows, but it is manifest that the structural details may be variously modified to adapt the mechanism for other uses without involving any departure from the principle involved or sacrificing any of the advantages secured. Hence, I reserve such variations and modifications as fall within the spirit and purview of the appended claims.

I claim—

1. In a device of the character described, the combination of a draft bar, a V-shaped quadrant frame rigidly mounted on said draft bar, an arcuate rack-bar mounted on the upper end of said quadrant frame, a curved rack-bar pivoted at one end on the apex of said quadrant frame and lying laterally opposite to said arcuate rack-bar, a pull and push link connected to the other end of said curved rack-bar, a lever pivoted at its lower end on the pivot of said curved rack-bar, and independently operable locking dogs on said lever co-operating with said rack-bars respectively.

2. In a device of the character described, the combination of a draft bar, a V-shaped quadrant frame rigidly mounted on said draft-bar, an arcuate rack-bar spanning the limbs of said frame, a gooseneck rack-bar pivoted at one end on the apex of said frame and disposed laterally opposite to said arcuate rack-bar and its frame, a pull and push link connected to the other end of said gooseneck rack-bar, a lever pivoted at its lower end on the pivot of said gooseneck rack-bar and lying between the latter and said arcuate rack-bar, guides mounted on opposite sides of said lever, and independently operable locking dogs having stems slidable in said guides and teeth on their lower ends playing through slots in said guides and cooperating respectively with said rack-bars.

JOSEPH E. BODA.